US008438554B1

(12) United States Patent
Grover et al.

(10) Patent No.: US 8,438,554 B1
(45) Date of Patent: May 7, 2013

(54) SYSTEM, METHOD, AND COMPUTER PROGRAM PRODUCT FOR REMOVING A SYNCHRONIZATION STATEMENT

(75) Inventors: Vinod Kumar Grover, Mercer Island, WA (US); John Stratton, Champaign, IL (US)

(73) Assignee: NVIDIA Corporation, Santa Clara, CA (US)

( * ) Notice: Subject to any disclaimer, the term of this patent is extended or adjusted under 35 U.S.C. 154(b) by 1181 days.

(21) Appl. No.: 12/333,241

(22) Filed: Dec. 11, 2008

(51) Int. Cl.
*G06F 9/44* (2006.01)
*G06F 9/45* (2006.01)
*G06F 9/46* (2006.01)

(52) U.S. Cl.
USPC ........... 717/154; 717/128; 717/131; 717/148; 717/151; 718/102; 718/107

(58) Field of Classification Search ........................ None
See application file for complete search history.

(56) References Cited

U.S. PATENT DOCUMENTS

| | | | |
|---|---|---|---|
| 6,067,415 A * | 5/2000 | Uchihira ........................ | 717/131 |
| 6,343,371 B1 * | 1/2002 | Flanagan et al. .............. | 717/124 |
| 6,557,168 B1 * | 4/2003 | Czajkowski ................... | 717/151 |
| 7,603,663 B2 * | 10/2009 | Wu et al. ........................ | 717/151 |
| 8,104,028 B2 * | 1/2012 | Stoodley et al. .............. | 717/148 |
| 2002/0129306 A1 * | 9/2002 | Flanagan et al. .............. | 714/100 |
| 2003/0236951 A1 * | 12/2003 | Choi et al. ..................... | 711/150 |
| 2004/0221272 A1 * | 11/2004 | Wu et al. ........................ | 717/128 |
| 2004/0237073 A1 * | 11/2004 | Wu et al. ........................ | 717/154 |
| 2004/0250240 A1 * | 12/2004 | Stoodley et al. .............. | 717/116 |
| 2006/0219772 A1 * | 10/2006 | Bernstein et al. ............. | 235/379 |
| 2007/0150509 A1 * | 6/2007 | Lev et al. ...................... | 707/103 R |
| 2008/0189692 A1 * | 8/2008 | Inglis et al. .................... | 717/154 |
| 2009/0019451 A1 * | 1/2009 | Matsuzaki et al. ............ | 718/107 |
| 2011/0078690 A1 * | 3/2011 | Fahs et al. ..................... | 718/102 |
| 2011/0167413 A1 * | 7/2011 | Kim et al. ..................... | 717/131 |

OTHER PUBLICATIONS

P.F.G. Dechering, "V_cal: Using a Calculus for the Compilation of Data Parallel Languages", [Online], 1996, pp. 1-17, [Retrieved from Internet on Feb. 13, 2012], <http://www.springerlink.com/content/m2486xh36456um05/fulltext.pdf>.*

Mark Stoodley et al., "Automatically Reducing Repetitive Synchronization with a Just -in-Time Compiler for Java", [Online], 2005,pp. 1-10,[Retrieved from Internet on Sep. 7, 2012], <http://dl.acm.org/citation.cfm?id=1048972>.*

Jong-Deok Choi et al., "Escape Analysis for Java", [Online], ACM-1999, pp. 1-19, [Retrieved from Internet on Aug. 30, 2012, <http://www.ecst.csuchico.edu/~juliano/csci693/Presentations/2008w/Materials/Swisher/DOCS/sources/Escape%20Analysis%20for%20Java.pdf>.*

Shuvra S. Bhattacharyya et al. "Optimizing Synchronization in Multiprocessor DSP Systems", [Online], Feb. 1997, pp. 1-39, [Retrieved from Internet on Feb. 22, 2013], <http://ftp.task.gda.pl/site/ptolemy/www/papers/97/synchronization/synch.pdf>.*

Shigehisa Satoh et al., "Compiler Optimization Techniques for OpenMP Programs", [Online], 2001, pp. 1-10, [Retrieved from Internet on Feb. 22, 2013], <http://www.compunity.org/events/pastevents/ewomp2000/SatohPaper.pdf>.*

(Continued)

*Primary Examiner* — Thuy Dao
*Assistant Examiner* — Ziaul A Chowdhury
(74) *Attorney, Agent, or Firm* — Zilka-Kotab, PC

(57) ABSTRACT

A system, method, and computer program product are provided for removing a synchronization statement. In use, synchronization statements are identified. Additionally, the synchronization statements are analyzed. Furthermore, the synchronization statements are removed based on the analysis.

21 Claims, 3 Drawing Sheets

OTHER PUBLICATIONS

Antony L. Hosking, "Partial Redundancy Elimination for Access Path Expressions", [Online], 1998, pp. 1-14, [Retrieved from Internet on Feb. 22, 2013], <http://docs.lib.purdue.edu/cgi/viewcontent.cgi?article=2430&context=cstech>.*

Long Li et al., "Automatic Multithreading and Multiprocessing of C Programs for IXP", [Online], ACM 2005, pp. 132-141, [Retrieved from Internet on Feb. 22, 2013], <http://delivery.acm.org/10.1145/1070000/1065963/p132-long.pdf>.*

* cited by examiner

SYSTEM, METHOD, AND COMPUTER PROGRAM PRODUCT FOR REMOVING A SYNCHRONIZATION STATEMENT

FIELD OF THE INVENTION

The present invention relates to synchronization within a computer program, and more particularly to computer program synchronization statements.

BACKGROUND

Traditionally, synchronization statements (e.g. instructions, etc.) have been utilized for synchronizing data among processes, threads, etc. For example, the synchronization statements are oftentimes implemented for synchronizing execution of multiple threads within a thread block. However, various limitations have generally been associated with implementations of such synchronization statements.

In many cases, computer programs include more synchronization than necessary. Just by way of example, computer programs may use synchronization statements in a library function which is designed to be used in a variety of situations, but in certain usage settings the synchronization statements may not be necessary. There is thus a need for addressing these and/or other issues associated with the prior art.

SUMMARY

A system, method, and computer program product are provided for removing a synchronization statement. In use, synchronization statements are identified. Additionally, the usage of synchronization statements, in a program, are analyzed. Furthermore, the synchronization statements are removed based on the analysis.

DETAILED DESCRIPTION

Figure 1:
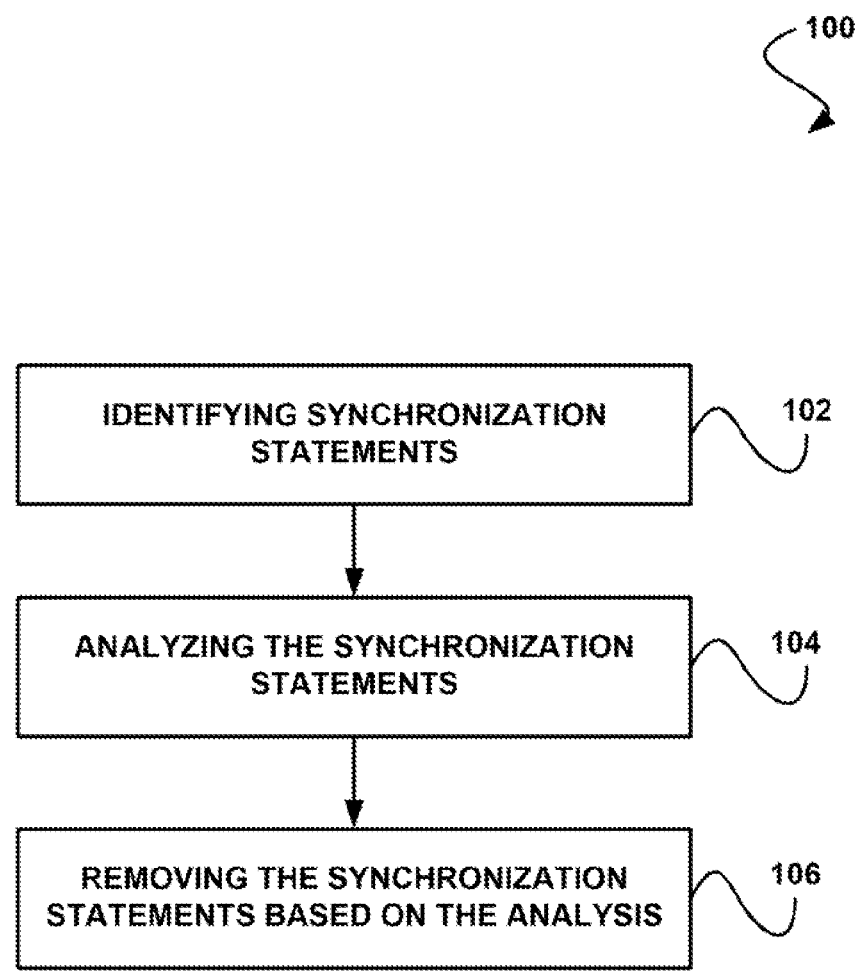
FIG. 1 shows a method for removing a synchronization statement, in accordance with one embodiment.

FIG. 1 shows a method 100 for removing a synchronization statement, in accordance with one embodiment. As shown in operation 102, synchronization statements are identified. With respect to the present description, the synchronization statements may each include any statement (e.g. code, program level statements, instructions, etc.) utilized (e.g. in a function, etc.) for performing synchronization.

In various embodiments, the synchronization statement may be executed for synchronizing data (e.g. libraries), processes, threads, etc. For example, in one optional embodiment, the synchronization statement may include a barrier synchronization statement. Thus, the synchronization statement may be inserted into code of a computer program manually by a programmer of the computer program, automatically by virtue of being included in a library of the computer program, etc.

As another example, the synchronization statement may constrain an ordering of operations in a multithreaded portion of a computer program. Further, the synchronization statement may optionally only constrain operations that are visible (e.g. shared) by multiple threads (e.g. that are not local or private to a single thread). As yet another option, the operations constrained by the synchronization statement may only include shared memory accesses (e.g. because local variables may not necessarily be shared across multiple threads, because texture and constant memory spaces may be read-only, because global memory may not necessarily enforce inter-thread consistency, etc.).

It should be noted that the synchronization statements may be identified in any desired manner. In one embodiment, each synchronization statement may be identified by determining a plurality of properties of the synchronization statement. For example, code of the computer program which includes the synchronization statement may be analyzed for identifying properties of a statement (e.g. instructions, etc.) of the code which indicate that such statement is a synchronization statement.

Just by way of example, the properties of the statement may be compared to properties predetermined to be indicative of a synchronization statement, such that a match may result in a determination that such statement is a synchronization statement. Optionally, the properties predetermined to be indicative of a synchronization statement may include a type of operation constrained by the synchronization statement (e.g. shared memory access operation, etc.), a function included in the synchronization statement (e.g. a synchronization function), etc.

Additionally, the synchronization statements are analyzed, as shown in operation 104. In one embodiment, analyzing the synchronization statements may include determining whether each synchronization statement constrains a plurality of operations (e.g. visible to multiple threads, etc.). For example, analyzing the synchronization statement may include determining whether the synchronization statement constrains a plurality of shared memory accesses.

Optionally, determining whether the synchronization statement constrains operations may include determining whether a first operation (e.g. a first shared memory access) exists prior to the synchronization statement and whether a second operation (e.g. a second shared memory access) exists after the synchronization statement. As another option, determining whether the synchronization statement constrains operations may include determining whether a program path exists with a first operation (e.g. a first shared memory access) before the synchronization statement and a second operation (e.g. a second shared memory access) after the synchronization statement, and without another synchronization statement between the first operation and the second operation.

In another embodiment, analyzing the synchronization statements may include determining whether each synchronization statement is redundant with another synchronization statement. Just by way of example, a synchronization statement may be determined to be redundant with the other synchronization statement if the synchronization statement does not add any additional constraints on operations (e.g. shared memory accesses) beyond constraints on the operations provided by the other synchronization statement. As another example, the synchronization statement may be determined to be redundant with the other synchronization statement if the synchronization statement and the other synchronization statement are located between the same operations (e.g. shared memory accesses).

In yet another embodiment, analyzing the synchronization statements may include traversing backwards through statements immediately preceding each synchronization statement to identify another synchronization statement. In still yet another embodiment, analyzing the synchronization statements may include traversing backwards through a basic block of code immediately preceding a synchronization statement to identify another synchronization statement. In this way, it may optionally be determined whether the synchronization statement and the identified other synchronization statement are redundant (e.g. as described above). While various embodiments have been described above for analyzing the synchronization statements, it should be noted that the synchronization statements may be analyzed in any manner capable of providing a basis for determining whether to remove such synchronization statements, for example, as described in more detail below.

Moreover, as shown in operation 106, the synchronization statements are removed based on the analysis. In one embodiment, each of the synchronization statements may be removed if it is determined based on the analysis that the synchronization statement is redundant with another synchronization statement. In this way, a synchronization statement that is unnecessary to semantics of a computer program, that is unnecessary to a correct execution of the computer program, that is ineffective with respect to the computer program, etc. may be removed (e.g. for reducing overhead of the computer program including the synchronization statements, etc.).

In another embodiment, the synchronization statements may be flagged based on the analysis. For example, the flag(s) may indicate whether each synchronization statement is redundant. To this end, the flag may optionally indicate whether to remove the synchronization statements, such that the synchronization statements may be removed based on the flag.

In yet another embodiment, each synchronization statement may be removed if it is determined based on the analysis that the synchronization statement does not add any additional constraints on shared memory operations beyond constraints on the shared memory operations provided by another synchronization statement. In still yet another embodiment, each synchronization statement may be removed if it is determined based on the analysis that a first operation (e.g. shared memory access) does not exist prior to the synchronization statement and/or a second operation (e.g. shared memory access) does not exist after the synchronization statement. Thus, the synchronization statement may be removed if it is determined based on the analysis that the synchronization statement and another intervening synchronization statement exist between the first operation and the second operation.

Just by way of example, a synchronization statement which constrains an ordering of a first operation and a second operation may be identified. Such synchronization statement may include a statement manually programmed into a computer program by a computer programmer, as an option. Furthermore, another synchronization statement which constrains the ordering of the first operation and the second operation may also be identified. The other synchronization statement may include a statement included in a predefined library of the computer program, as an option.

To this end, the synchronization statement and the other synchronization statement may be determined to be redundant, such that one of the synchronization statement and the other synchronization statement may be removed. As an option, one of the synchronization statement or the other synchronization statement may be selected for removal based on any desired criteria (e.g. a first one of the synchronization statement and the other synchronization statement to be identified, a last one of the synchronization statement and the other synchronization statement to be identified, etc.).

As an option, the receiving (operation 102), the analyzing (operation 104) and the removing (operation 106) may be performed by a compiler. Thus, the method 100 of FIG. 1 may be implemented in computer code (e.g. of the compiler), and accordingly carried out via execution by a processor of such computer code.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
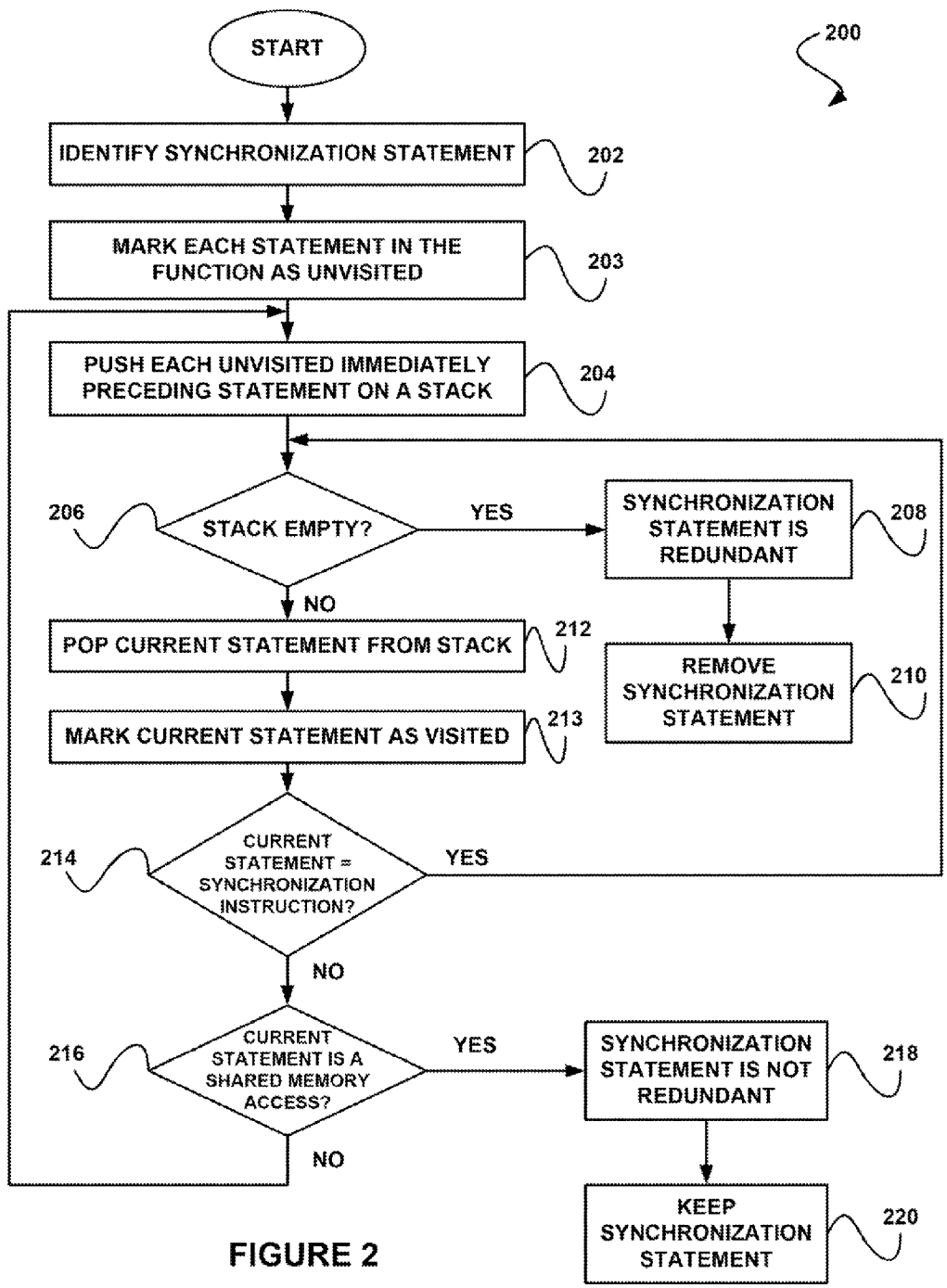
FIG. 2 shows a method for removing a redundant synchronization statement, in accordance with another embodiment.

FIG. 2 shows a method 200 for removing a redundant synchronization statement, in accordance with another embodiment. As an option, the method 200 may be carried out in the context of the method 100 of FIG. 1. Of course, however, the method 200 may be carried out in any desired manner. It should also be noted that the aforementioned definitions may apply during the present description.

As shown in operation 202, a synchronization statement is identified. As an option, the synchronization statement may be identified utilizing properties thereof. For example, properties of the synchronization statement may be matched to properties predetermined to be indicative of a synchronization statement. As also shown, each identified statement in the function (including the synchronization statement) is marked as unvisited. Note operation 203. It should be noted that the statements may be marked as unvisited in any desired manner, such as, for example, by flagging the statements, etc.

In addition, each statement immediately preceding the synchronization statement is pushed on a stack, as shown in operation 204. For example, statements preceding the synchronization statement may be traversed backwards, pushing each traversed statement onto the stack. As an option, the statements preceding the synchronization statement may be traversed backwards until another synchronization statement is reached, such that the other synchronization statement is the last statement pushed onto the stack, or, if no other synchronization statement is reached, until the beginning of a computer program including the synchronization statement is reached.

It should be noted that while the traversal is described above in terms of statements of the computer program, the traversal may be performed over basic blocks of the computer program. The basic blocks may each include code of the computer program with a single entry point, a single exit point, and without any jump instructions between such entry point and exit point. Thus, for example, each basic block immediately preceding the synchronization statement may be pushed on the stack (e.g. until another synchronization statement is identified, or the beginning of the computer program is otherwise reached) for providing greater efficiency in traversing the computer program than otherwise provided by way of traversal of each of the preceding statements of the computer program.

As an option, during a first pass of determining whether the computer program includes redundant synchronization statements, the statements may be traversed. Traversal of the statements may further allow basic blocks of the computer program to be identified. In addition, a state may be determined and stored for each identified basic block. The state may indicate whether an associated synchronization statement (e.g. synchronization statement which constrains the basic block) is redundant. Thereafter, during any subsequent pass of determining whether the computer program includes redundant synchronization statements, the basic blocks may be traversed.

Further, as shown in decision 206, it is determined whether the stack is empty. The stack may be empty if no statements precede the synchronization statement, for example. If the stack is determined to be empty in decision 206, the synchronization statement is identified as redundant (or otherwise unnecessary to semantics of the computer program). Note operation 208.

In one optional embodiment, the synchronization statement may be flagged for indicating that such synchronization statement is redundant. The flag may indicate whether to remove the synchronization statement, for example. Accordingly, as shown, the synchronization statement is removed, as shown in operation 210 (e.g. in accordance with the flag).

If it is determined in decision 206 that the stack is not empty, a current statement is popped from the stack. Note operation 212. The current statement may include a first statement pushed onto the stack, for example. In this way, the statement immediately preceding the synchronization statement may be popped from the stack, and therefore identified. Further, the current statement is marked as visited, as shown in operation 213. The current statement may be marked as visited, for example, by changing a value of a flag associated with the current statement. In this way, marking the current statement as visited may ensure that the current statement is pushed onto the stack (in operation 204) and further processed (as described below in operations 214-220) only once during the method 300.

Moreover, it is determined whether the current statement includes a synchronization statement, as shown in decision 214. The determination may be based on properties of the current statement. For example, the current statement may be determined to be a synchronization statement if properties of the current statement match properties predetermined to be indicative of a synchronization statement.

If it is determined that the current statement includes a synchronization statement, it is again determined whether the stack is empty (decision 206). If the stack is empty, then it may be determined that the synchronization statement identified in operation 202 is redundant of the synchronization statement identified in decision 214, and thus the synchronization statement identified in operation 202 or the synchronization statement identified in decision 214 is removed (operation 210).

If, however, it is determined in decision 214 that the current statement does not include a synchronization statement, it is determined whether the current statement is a shared memory access. Note decision 216. The determination may be made based on properties of the current statement. For example, the current statement may be determined to be a shared memory access if properties of the current statement match properties predetermined to be indicative of a shared memory access statement.

If it is determined in decision 216 that the current statement does not include a shared memory access, each immediately preceding unvisited statement is pushed onto the stack (operation 204). Accordingly, each statement immediately preceding the current statement may be pushed onto the stack (e.g. until another synchronization statement is identified, or otherwise until a beginning of the program is reached). For example, each statement immediately preceding the current statement may be traversed and pushed onto the stack.

If, however, it is determined in decision 216 that the current statement does include a shared memory access, it is determined that the synchronization statement is not redundant (or otherwise unnecessary to semantics of the computer program), as shown in operation 218.

In one optional embodiment, the synchronization statement may be flagged for indicating that such synchronization statement is not redundant. The flag may indicate that the synchronization statement is not to be removed, for example. Accordingly, as shown, the synchronization statement may be kept in the computer program, as shown in operation 220 (e.g. in accordance with the flag).

As an option, the method 200 may be carried out by way of computer code (e.g. executable by a compiler). The computer code may take as input a high-level intermediate representation (IR) for a function (or procedure) and a worklist containing all synchronization statements in the function represented by the input IR. In one embodiment, the IR may reflect a control flow graph (CFG) of the function, and may represent synchronization statements (e.g. barrier synchronization statements) as statements within the representation.

For each synchronization statement in the worklist, a list of statements may be defined which includes all statements preceding the synchronization statement within a basic block. Furthermore, a first portion of code (of the compiler) may take as input the list of statement, and may output a Boolean value signifying whether or not the synchronization statement is redundant after the list of statements.

For example, beginning with a last statement in the list, all statements in the list may be iterated over backwards until reaching an operation capable of being shared across multiple threads (e.g. a shared memory access), another synchronization statement, or a beginning of the list. If such an operation is first encountered, a TRUE value is output. If another synchronization statement is first encountered, a FALSE value is output. If a TRUE value is output, the synchronization statement is flagged as not being redundant and is retained in the computer program. If a FALSE value is output, the synchronization statement is flagged as redundant and is removed from the computer program.

If the beginning of the list is first encountered, a second portion of code (of the compiler) may be applied to each predecessor of the basic block. The second portion of code may receive as input the basic block in the control flow graph, and may output a Boolean value indicating whether the synchronization statement would be redundant after the basic block. For example, if the basic block has already been marked as traversed, a FALSE value may be output. Otherwise, the current basic block may be marked as traversed and may apply the first portion of code to a list of all statements included in the basic block. The current basic block may then be marked as untraversed, and the first portion of code may output a Boolean value indicating a result.

As an option, a result (e.g. output) of the second portion of code may be persistent. Thus, if the second portion of code is invoked for a basic block more than once, it may always output the same Boolean value for each invocation. For example, the result of the second portion of code for each basic block may be saved. If a basic block is again invoked, it may first be determined whether a saved result is available before applying the second portion of code to the basic block. To this end, if a saved result is available for the basic block, the second portion of code may be prevented from being repetitively applied to the basic block.

Figure 3:
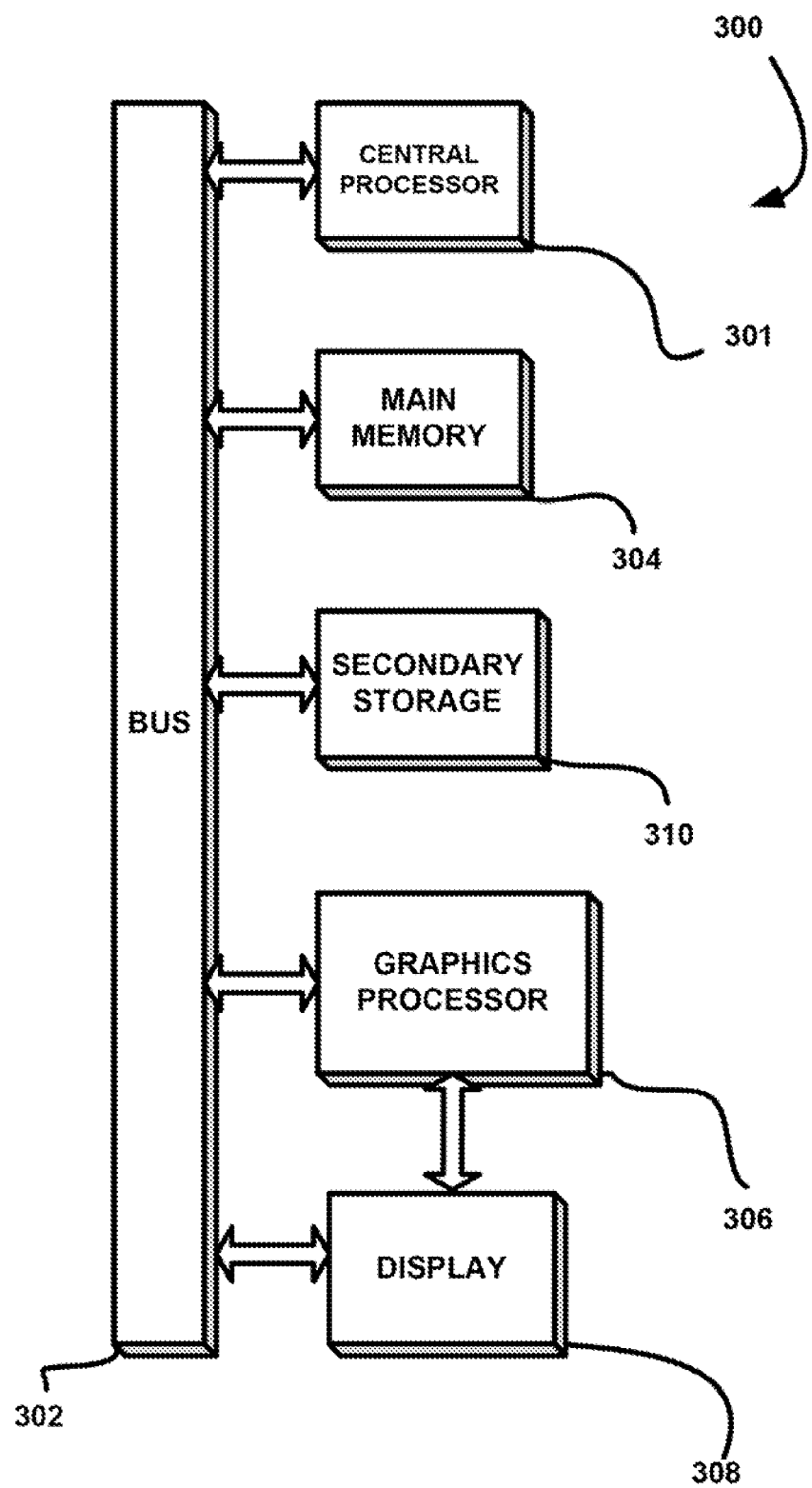
FIG. 3 illustrates an exemplary system in which the various architecture and/or functionality of the various previous embodiments may be implemented.

FIG. 3 illustrates an exemplary system 300 in which the various architecture and/or functionality of the various previous embodiments may be implemented. As shown, a system 300 is provided including at least one host processor 301 which is connected to a communication bus 302. The system 300 also includes a main memory 304. Control logic (software) and data are stored in the main memory 304 which may take the form of random access memory (RAM).

The system 300 also includes a graphics processor 306 and a display 308, i.e. a computer monitor. In one embodiment, the graphics processor 306 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 300 may also include a secondary storage 310. The secondary storage 310 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 304 and/or the secondary storage 310. Such computer programs, when executed, enable the system 300 to perform various functions. Memory 304, storage 310 and/or any other storage are possible examples of computer-readable media.

In one embodiment, the architecture and/or functionality of the various previous figures may be implemented in the context of the host processor 301, graphics processor 306, an integrated circuit (not shown) that is capable of at least a portion of the capabilities of both the host processor 301 and the graphics processor 306, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 300 may take the form of a desktop computer, lap-top computer, and/or any other type of logic. Still yet, the system 300 may take the form of various other devices m including, but not limited to a personal digital assistant (PDA) device, a mobile phone device, a television, etc.

Further, while not shown, the system 300 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method executed by a processor, the method comprising:
   identifying a first synchronization statement included in program code;
   traversing backwards from the first synchronization statement toward a beginning of the program code;
   pushing each traversed statement of the program code onto a stack until a first occurrence of:
   a second synchronization statement included in the program code is reached, and
   the beginning of the program code is reached;
   pushing the second synchronization statement onto the stack when the second synchronization statement is reached;
   analyzing the stack; and
   removing the first synchronization statement from the computer program based on the analysis of the stack, including:
   removing first synchronization statement from the program code when:
   it is determined that the second synchronization statement is included in the stack and it is determined that the first synchronization statement is redundant to the second synchronization statement.

2. A system, comprising:
   a processor for:
   identifying a first synchronization statement included in program code;
   traversing backwards from the first synchronization statement toward a beginning of the program code;
   pushing each traversed statement of the program code onto a stack until a first occurrence of:
   a second synchronization statement included in the program code is reached, and
   the beginning of the program code is reached;
   pushing the second synchronization statement onto the stack when the second synchronization statement is reached;
   analyzing the stack; and
   removing the first synchronization statement from the computer program based on the analysis of the stack, including:
   removing the first synchronization statement from the program code when:
   it is determined that the second synchronization statement is included in the stack and it is determined that the first synchronization statement is redundant to the second synchronization statement.

3. The system of claim 2, wherein the processor remains in communication with memory and a display via a bus.

4. A computer program product embodied on a non-transitory computer readable medium, comprising:
   computer code for identifying a first synchronization statement included in program code;
   computer code for traversing backwards from the first synchronization statement toward a beginning of the program code;
   computer code for pushing each traversed statement of the program code onto a stack until a first occurrence of:
   a second synchronization statement included in the program code is reached, and
   the beginning of the program code is reached;
   computer code for pushing the second synchronization statement onto the stack when the second synchronization statement is reached;
   computer code for analyzing the stack; and
   computer code for removing the first synchronization statement from the computer program based on the analysis of the stack, including:
   removing the first synchronization statement from the program code when:

it is determined that the second synchronization statement is included in the stack and it is determined that the first synchronization statement is redundant to the second synchronization statement.

5. The computer program product of claim 4, wherein the first and second synchronization statements constrain an ordering of operations in a multithreaded portion of the computer program.

6. The computer program product of claim 4, wherein identifying the first synchronization statement includes determining a plurality of properties of the first synchronization statement.

7. The computer program product of claim 6, wherein identifying the first synchronization statement further includes matching the plurality of properties of the first synchronization statement to properties predetermined to be indicative of synchronization statements.

8. The computer program product of claim 4, further including computer code for determining whether each of the first and second synchronization statements constrains a plurality of shared memory accesses.

9. The computer program product of claim 8, wherein determining whether each of the first and second synchronization statements constrains a plurality of shared memory accesses includes determining whether a first shared memory access exists prior to the synchronization statement and whether a second shared memory access exists after the synchronization statement.

10. The computer program product of claim 8, wherein determining whether each of the first and second synchronization statements constrains a plurality of shared memory accesses includes determining whether a program path exists with a first shared memory access before the synchronization statement and a second shared memory access after the synchronization statement, and without another synchronization statement between the first shared memory access and the second shared memory access.

11. The computer program product of claim 4, wherein the first synchronization statement is redundant with respect to the second synchronization statement if the first synchronization statement does not add any additional constraints on shared memory accesses beyond constraints on the shared memory accesses provided by the second synchronization statement.

12. The computer program product of claim 4, wherein traversing backwards from the first synchronization statement toward the beginning of the program code includes traversing backwards through a basic block of code immediately preceding the first synchronization statement to identify the second synchronization statement.

13. The computer program product of claim 12, further comprising determining and storing a state of the basic block of code.

14. The computer program product of claim 13, wherein the state stored for the basic block of code indicates whether a synchronization statement that constrains the basic block of code is redundant.

15. The computer program product of claim 4, wherein the first synchronization statement is redundant to the second synchronization statement and removed if it is determined that the first synchronization statement does not add any additional constraints on shared memory accesses beyond constraints on the shared memory accesses provided by the second synchronization statement.

16. The computer program product of claim 4, wherein each of the first and second synchronization statements is removed if it is determined that a first shared memory access does not exist immediately prior to the synchronization statement or a second shared memory access does not exist immediately after the synchronization statement.

17. The computer program product of claim 4, further comprising flagging the first synchronization statement based on the analysis.

18. The computer program product of claim 17, wherein the flag indicates whether to remove the first synchronization statement.

19. The computer program product of claim 4, the analyzing and the removing are performed by a compiler.

20. The computer program product of claim 4, wherein the second synchronization statement is a last statement pushed onto the stack.

21. The computer program product of claim 4, further including:
  popping the second synchronization statement from the stack;
  marking the second synchronization statement as visited;
  after popping the second synchronization statement from the stack, determining that the stack is empty; and
  in response to determining that the stack is empty, determining that the first synchronization statement is redundant with respect to the second synchronization statement.

* * * * *